United States Patent [19]
Klein et al.

[11] Patent Number: 5,195,798
[45] Date of Patent: Mar. 23, 1993

[54] RETRACTABLE ROOF FOR VEHICLES

[75] Inventors: Berthold Klein, Rutesheim; Anton Reichel, Ditzingen; Johann Tomforde; Bruno Sacco, both of Sindelfingen, all of Fed. Rep. of Germany

[73] Assignee: Mercedes-Benz AG, Fed. Rep. of Germany

[21] Appl. No.: 800,098

[22] Filed: Nov. 29, 1991

[30] Foreign Application Priority Data

Nov. 29, 1990 [DE] Fed. Rep. of Germany ....... 4038074

[51] Int. Cl.$^5$ ............... B60J 7/08; B60J 1/18
[52] U.S. Cl. ................. 296/146 L; 296/107; 296/116
[58] Field of Search ............... 296/107, 108, 116, 117, 296/146 L, 147, 136

[56] References Cited

U.S. PATENT DOCUMENTS

| | | | |
|---|---|---|---|
| 1,121,553 | 12/1914 | Dorl | 296/121 |
| 1,127,099 | 2/1915 | Shipley | 296/121 |
| 1,784,279 | 12/1930 | Ellerbeck | 296/107 |
| 1,988,346 | 1/1935 | Wagner | 296/107 |
| 2,596,355 | 5/1952 | Ackermans | 296/107 |
| 2,768,024 | 10/1956 | Spear, Jr. | 296/107 |
| 2,768,025 | 10/1956 | Spear, Jr. | 296/117 |
| 4,854,634 | 8/1989 | Shiraishi et al. | 296/108 |

FOREIGN PATENT DOCUMENTS 3733892 4/1989 Fed. Rep. of Germany ...... 296/108
756531 9/1956 United Kingdom ................ 296/107

OTHER PUBLICATIONS

Page 15, Auto Motor Sport, Sep. 21, 1990.

Primary Examiner—Dennis H. Pedder
Attorney, Agent, or Firm—Evenson, Wands, Edwards, Lenahan & McKeown

[57] ABSTRACT

A retractable roof for vehicles, in particular a hard roof for cabriolets, has roof pillars extending to the side of a rear window of the roof. The roof pillars, as seen from the vehicle side, enclose an obtuse angle with that longitudinal region of the roof which is situated in front of them. The pillars have a stowing position, when the roof is retracted, in a receiving space which is situated below the roof pillars when the roof is closed and into which the roof can be moved along its length, with the roof pillars in the lead, during retraction, after which they rest steeply erect in the receiving space. To ensure that the receiving space in the vehicle can be usefully reduced in size, the rear window forms the lower boundary of the roof over its width lying between the roof pillars when the roof is closed and can be moved out of its operating position into a stowing position which, with the roof retracted, is at a vertical distance from the lower ends of the roof pillars.

10 Claims, 8 Drawing Sheets

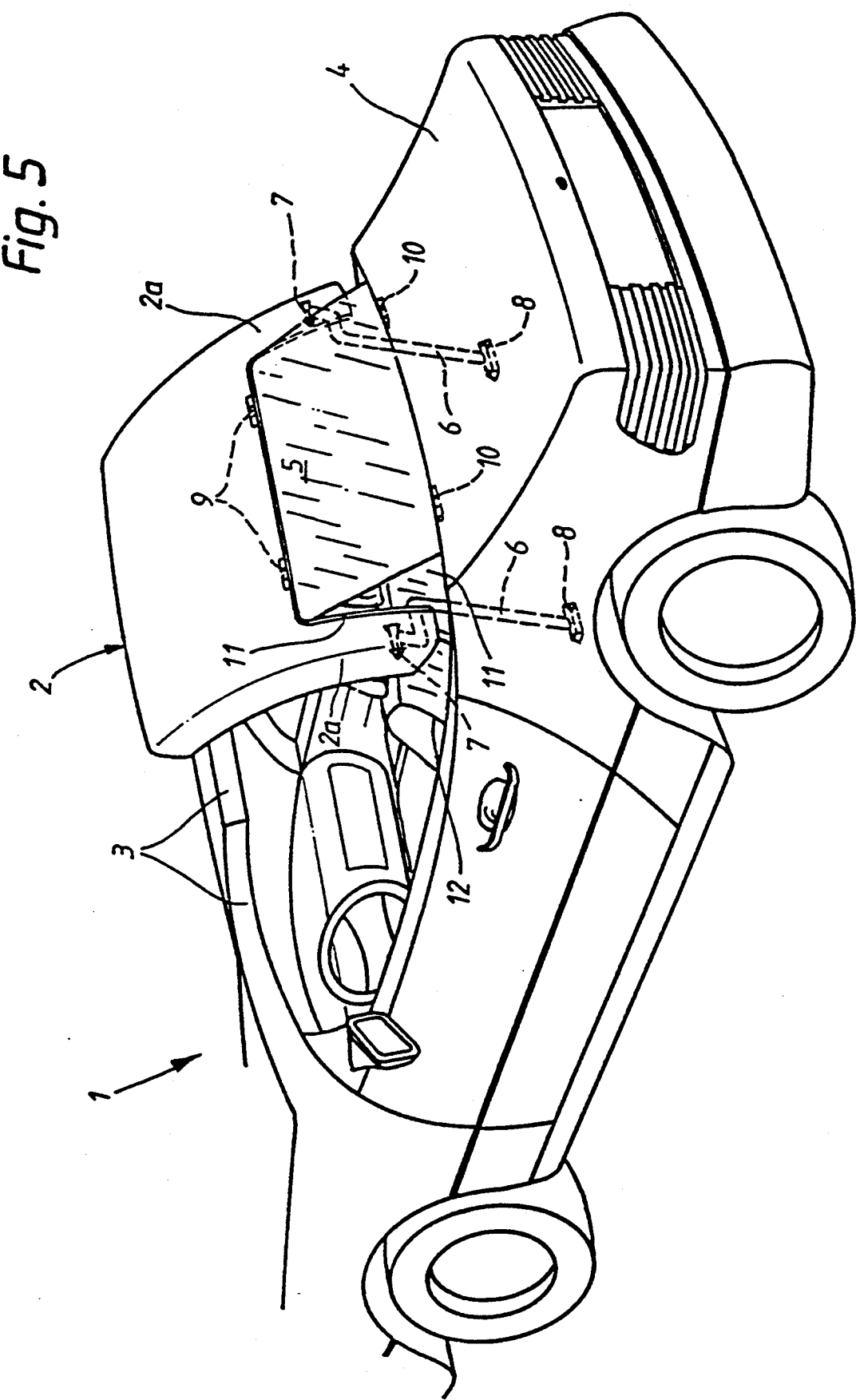

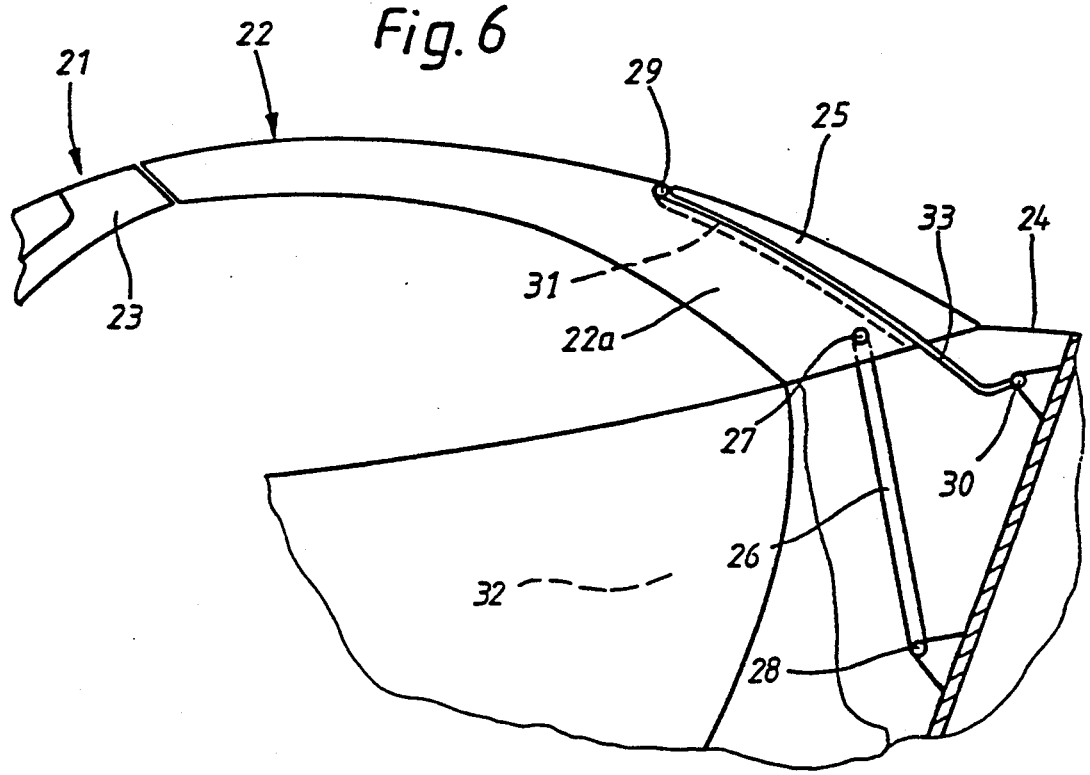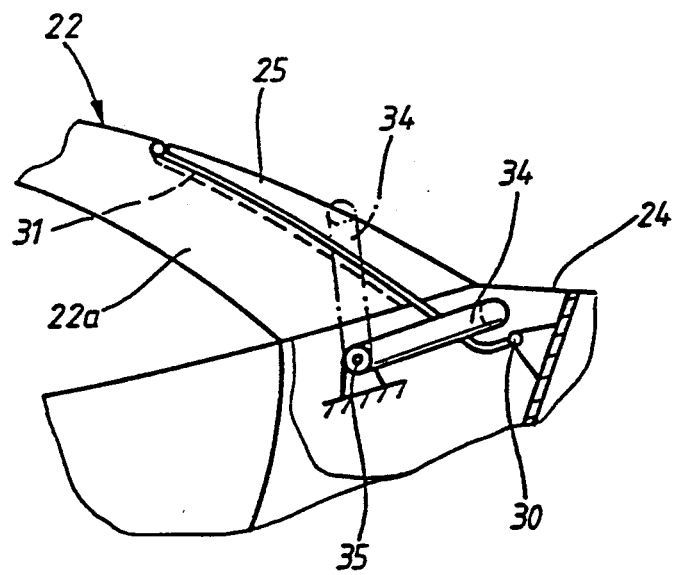

RETRACTABLE ROOF FOR VEHICLES

BACKGROUND AND SUMMARY OF THE INVENTION

The present invention relates to a retractable roof for vehicles, in particular to a hard roof for cabriolets, and, more particularly, to a retractable roof with roof pillars extending to the side of the roof rear windows. The roof has a stowing position in a receiving space which is situated below the roof pillars when the roof is closed, i.e. extending over the passenger space.

A retractable roof is shown in an article "Offen für alles", published in Vol. 20 of the "auto motor and sport" magazine of Sep. 21, 1990. In its retracted stowing position, the one-piece roof takes up a considerable space for its accommodation in the vehicle. This not only considerably limits the range of adjustment of the seats in front of it but, with the roof open, there are also no longer any possibilities for accommodating relatively small pieces of luggage behind the front seats.

An object of the present invention is to further improve a retractable roof such that the receiving space required in the vehicle for the retraction process of the roof is markedly reduced.

The solution according to the present invention has been achieved by providing that with the roof in the closed position, the rear window forms a lower boundary of the roof over a width of the roof laying between the roof pillars. The roof can be moved out of the closed or operative position with the stowing position such that the rear window is stowed at a vertical distance from the lower ends of the roof pillars. With the present invention, it is also contemplated that the rear window forming the lower boundary of the roof will comprise a window frame which holds the rear window.

The stowing position of the rear window is particularly space-saving if, with the roof retracted, the entirety of the rear window is arranged above the roof pillars. In this situation, the window aperture present between the roof pillars projecting obliquely forwards in the form of a fork can be used completely as an accommodation space for pieces of luggage or the like. In addition, even with the presence of a central tunnel in the vehicle, it is possible to bring the roof down low, into the immediate vicinity of the vehicle floor.

Another aspect of the present invention contemplates moving the rear window into the lowered position manually or by a motor before the roof retraction, for which purpose the rear window is configured to be displaced or even folded forwards in the longitudinal direction of the roof.

In order to achieve extremely simple operation of the roof during opening and closing, a constrained motion control of the roof via a link arrangement, in which the rear window is included, is provided. As a result, even the lifting of the rear window from its sealing seat on the roof during the retraction process and the accurately fitting placement of the rear window on its roof seat when the roof is closed proceed automatically. Since each guiding link is connected over its length of overlap to the rear window, the rear window has a simultaneous reinforcing effect on at least one guiding link.

In order to make possible a largely unobtrusive arrangement of the guiding links despite the transparency of the rear window, the rear window itself can be configured as a guiding link of correspondingly large size or can at least form a longitudinal region of several guiding links, which longitudinal region is visible with the roof closed. Such a configuration will be expedient especially when the rear window is composed of mineral glass.

Alternatively, however, an unobtrusive course of the guiding links is also possible along the lateral edges of the rear window in accordance with the present invention because the guiding links can be covered as decorative strips.

To enable the swivelling clearance required for swivelling down the rear window to be dimensioned shorter, as seen in the longitudinal direction of the vehicle, it is a further advantage of the present invention to have if the guiding links attached to the vehicle body at a longitudinal distance behind the rear window.

If a rear end region of the guiding links is angled or bent at a right angle upwards, the central region of a roll bar which can be swivelled up only with the roof open can be stowed between the lower window edge of the rear window and the attachment points of the guiding links on the body.

In order to ensure that the seal arrangement between the rear window and the roof is subjected to little shear due to frictional forces in the course of the relatively hinging movement, the guiding links can be divided by an intermediate joint into two longitudinal portions.

By way of a displaceable arrangement of two hinged joints of the link arrangement in the longitudinal direction of the vehicle, a more compact configuration of the receiving space for the roof is possible as seen in the vehicle longitudinal direction. To ensure that the constrained motion control of the roof is retained despite the displaceability, a pendulum-like suspension of the two hinged joints, via in each case one associated hinge lever, is provided.

BRIEF DESCRIPTION OF THE DRAWINGS

These and further objects, features and advantages of the present invention will become more apparent from the following detailed descriptions of a currently preferred embodiment when taken in conjunction with the accompanying drawings wherein:

FIG. 5 is a perspective rear view of the hard roof, in a phase of the opening movement which corresponds to that in FIG. 2;

FIG. 6 is a schematic partial side view of a cabriolet with a retractable hard roof and with a modified link arrangement in the closed condition;

FIG. 7 is a partial view similar to FIG. 6 but with an arrangement of a swivel-up roll bar;

DETAILED DESCRIPTION OF THE DRAWINGS

Figure 1:
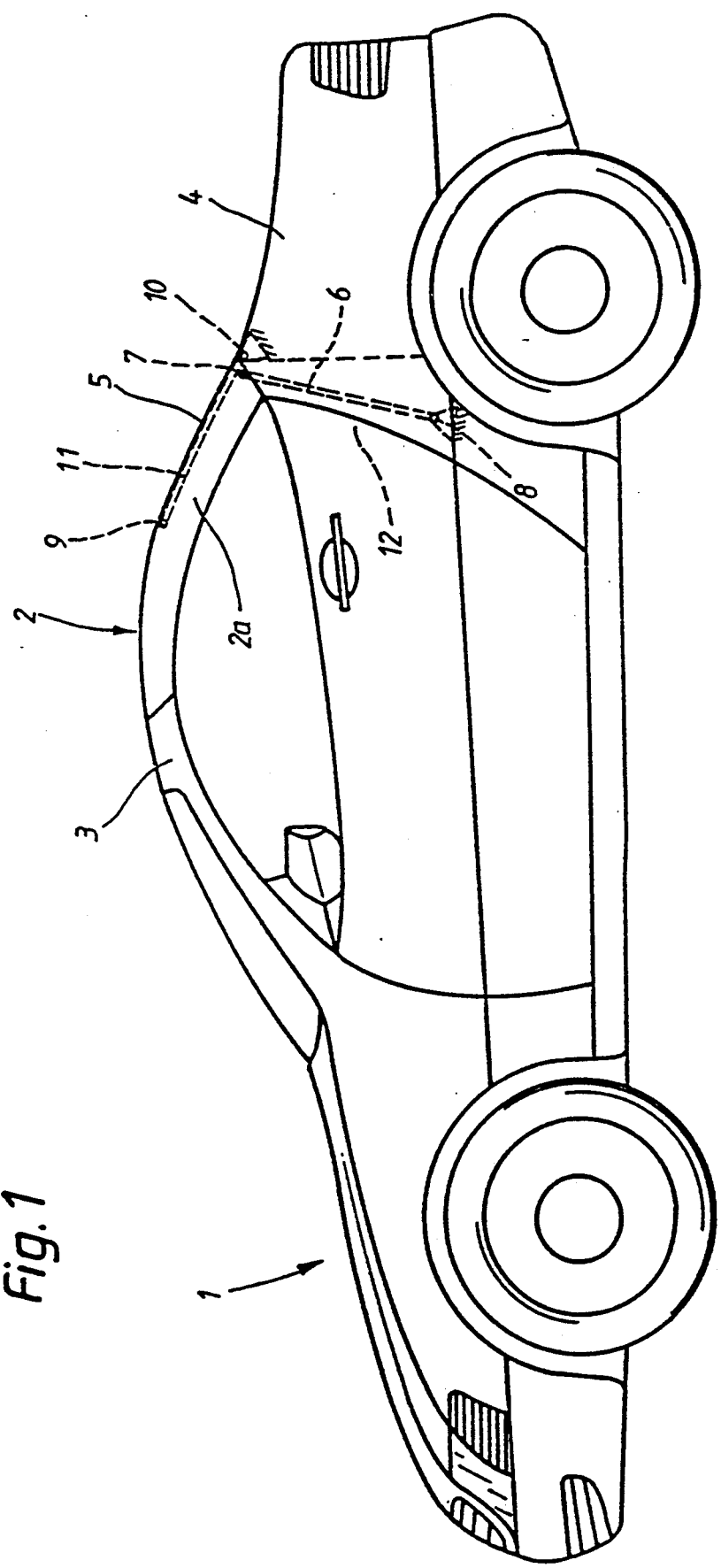
FIG. 1 is a schematic side view of a cabriolet with a retractable hard roof in the closed condition.

A cabriolet shown in FIG. 1 is provided with a rigid roof 2, by means of which an interior space of the cabriolet 1 is covered over adjoining a body frame 3 surrounding the windscreen, as far as a rear luggage-compartment part 4 of the body. In a rear longitudinal region, the roof 2, which consists of high-strength aluminum, has a rectangular rear window 5 (FIG. 5) which is enclosed on both sides by a roof pillar 2a belonging to the roof 2. As seen from the side, the roof pillars 2a enclose an obtuse angle of about 160° with respect to that longitudinal region of the roof 2 which is situated in front of them. The roof pillars 2a merge with an arcuate curvature into the lateral frame sections of the roof shell situated in front of them.

In the closed condition depicted in FIG. 1, the front end of the roof 2 rests on that section of the body frame 3 which extends above the windscreen and is releasibly connected to the latter via folding-top clamps (not shown). The rear end of the roof 2 is connected to the body of the cabriolet 1 via a link arrangement and thereby held in its operating position. This link arrangement comprises two supporting links 6, which are arranged in mirror symmetry in relation to the longitudinal center plan of the cabriolet 1, articulated by their upper end on the lower end of the associated roof pillar 2a and by their lower end on the body of the cabriolet 1. Hinge joints 7 and 8, each having a hinge axis extending at right angles to the longitudinal center plane, are used for the articulation, it thereby being possible to swivel the supporting links 6 about their hinge joint 8 in a plane parallel to the longitudinal center plane of the cabriolet 1. The plane in which the links 6 swing are situated to the side of the lower end of the associated roof pillar 2a. The straight supporting links 7 are inclined approximately at right angles to the longitudinal extension of the roof pillars 2a, as a result of which they are subjected primarily to buckling stress. Because of this stressing, the supporting links 6 are preferably of tubular design, which allows them to be both lightweight and particularly resistant to buckling.

The link arrangement furthermore comprises a large-size guiding link, which is here formed by the rear window 5. For this purpose, the rear window 5 is attached at the top to the roof 2 via two hinge joints 9 and at the bottom to the luggage-compartment part 4 via two hinge joints 10. The geometrical hinge axes of hinge joints 9 and 10 extend parallel to one another and to those of hinge joints 7 and 8. The two hinge joints 10 are at essentially the same height as the hinge joints 7 and, as seen in the longitudinal direction of the vehicle, are at only a short distance from these joints.

This arrangement of the hinge joints results in favorable leverages for a closing process of the roof 2 during which the frameless rear window 5 has to be pressed down onto its sealing seat 11 on the roof 2 counter to the force of a seal. Due to the fact that the lower edge of the rear window 5 is articulated on the luggage-compartment part 4, the lower edge side of the rear window 5 must also form the lower boundary of the roof 2. The sealing seat 11 is therefore only arranged on the roof 2 along the lateral window edges and the upper window edge, while, along the lower window edge, it is formed by a body flange of the luggage-compartment part 4. Furthermore, the swivelling length, of the rear window 5 functioning as a guiding link, predetermined by the spacing of hinge joints 9 and 10, corresponds essentially to the swivelling length of the two supporting links 6.

Figure 2:
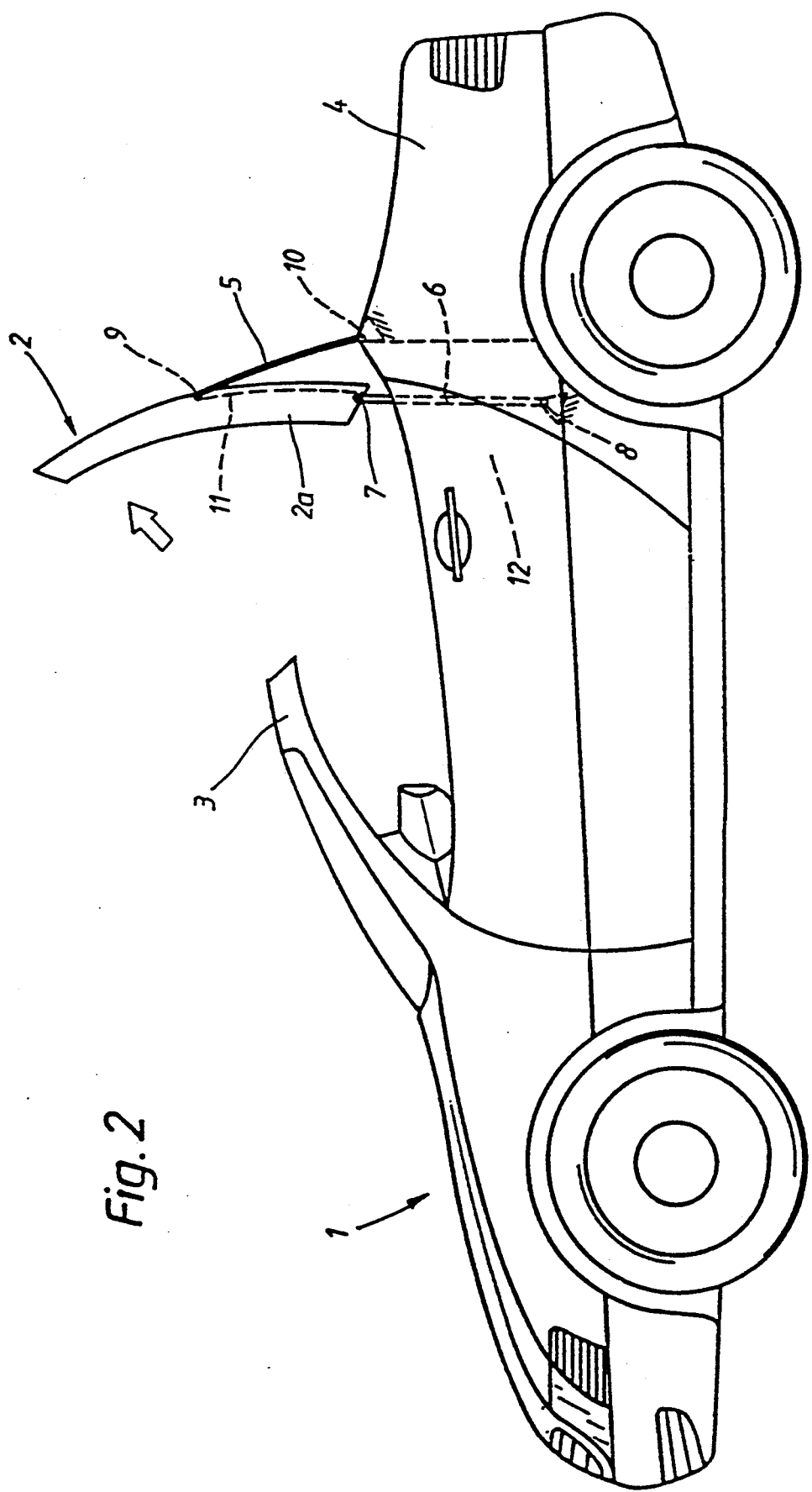
FIG. 2 is a view similar to FIG. 1 and shows the hard roof after the conclusion of a first phase of the opening movement.

Due to the above-described link arrangement, it is possible, after opening the front folding-top clamps in a conventional manner (not shown), to retract the roof 2 under constrained motion control into a receiving space 12 which is bounded in the interior of the cabriolet 1 by the backrests of the front seats and by an end wall of the luggage-compartment part 4. For this purpose, the roof 2 is raised at the front end until it has reached an almost vertically erect intermediate position which can be seen in FIG. 2. During this process, the supporting links 6 swing forwards about the hinge joints 8 until they reach a vertical position. The hinge joints 7 are thereby moved upwards, and the roof 2 is articulated via the hinge joints 7, thereby also being raised somewhat. At the same time, the distance of the hinge joints 7 from the hinge joints 10 increases, since the roof pillars 2a likewise swing forwards into a vertical position about the hinge joints 9. During this movement of the roof pillars 2a relative to the rear window 5, the latter is simultaneously lifted off its sealing seat 11. Since, in a vertical extended position, the hinge joints 7, 8 and 9 are situated one above the other, i.e. in a substantially straight line, this intermediate position is relatively stable, but can be overcome without problems by rearward-directed pushing or pulling on the upper end of the roof 2 or by forward-directed pushing or pulling on one of the roof pillars 2a, after which the roof 2 moves downwards and is lowered into the receiving space 12.

Figure 3:
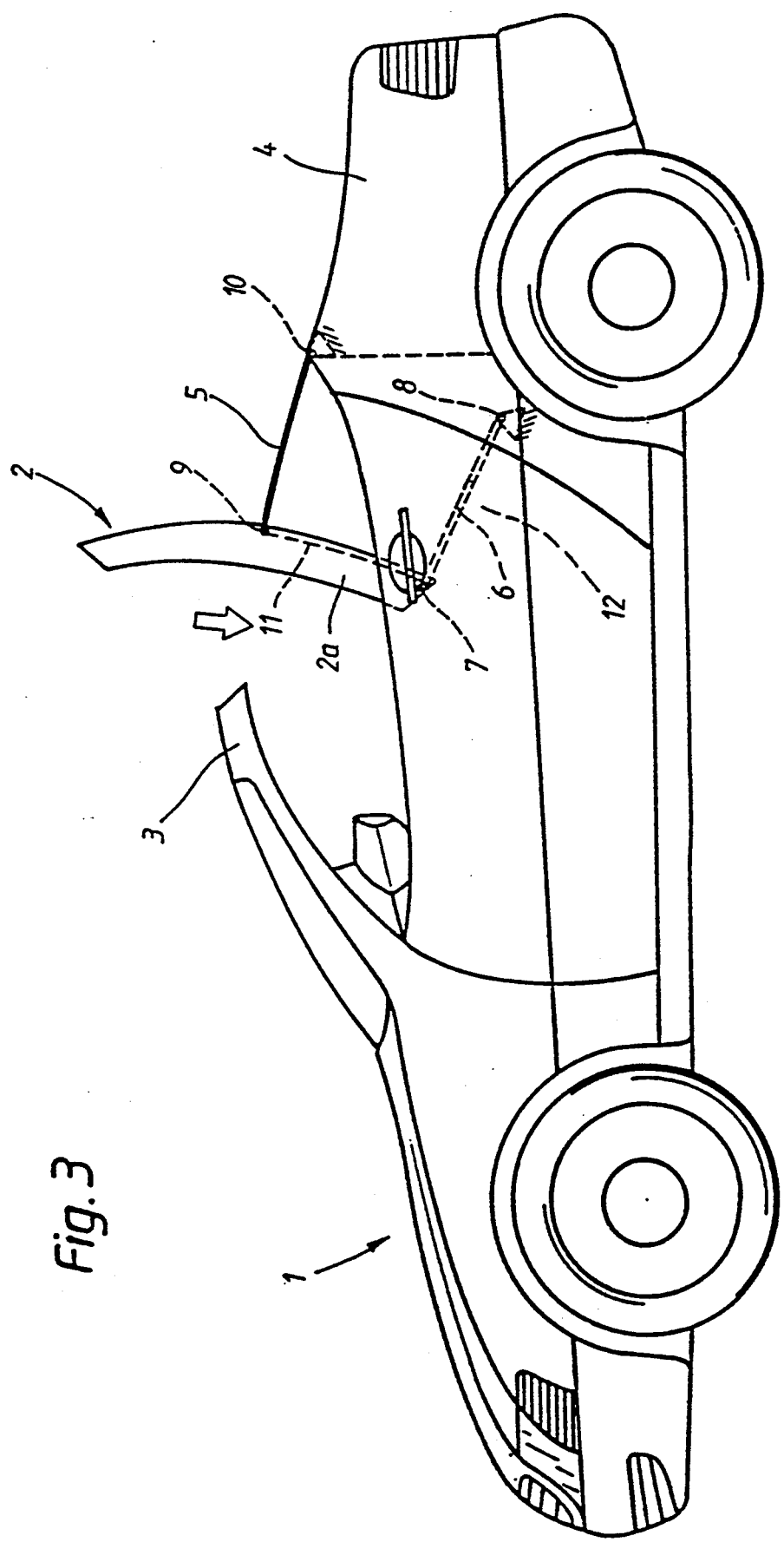
FIG. 3 is a view similar to FIG. 1 and shows the hard roof in a second phase of the opening movement, with the roof partially retracted.

Due to the link geometry, the roof 2 is pushed into the receiving space 12 situated below the roof pillars 2a at the beginning of the withdrawal process, as can be seen in FIG. 3. This lowering process, which occurs along the length of the roof 2, is effected by a parallel displacement of the roof, since the supporting links 6 and the rear window 5 with the roof pillars 2a interact in the manner of parallelogram. Since, during this process, the weight of the roof 2 acts in the same direction, the operating forces involved in the retraction process are minimal.

Figure 4:
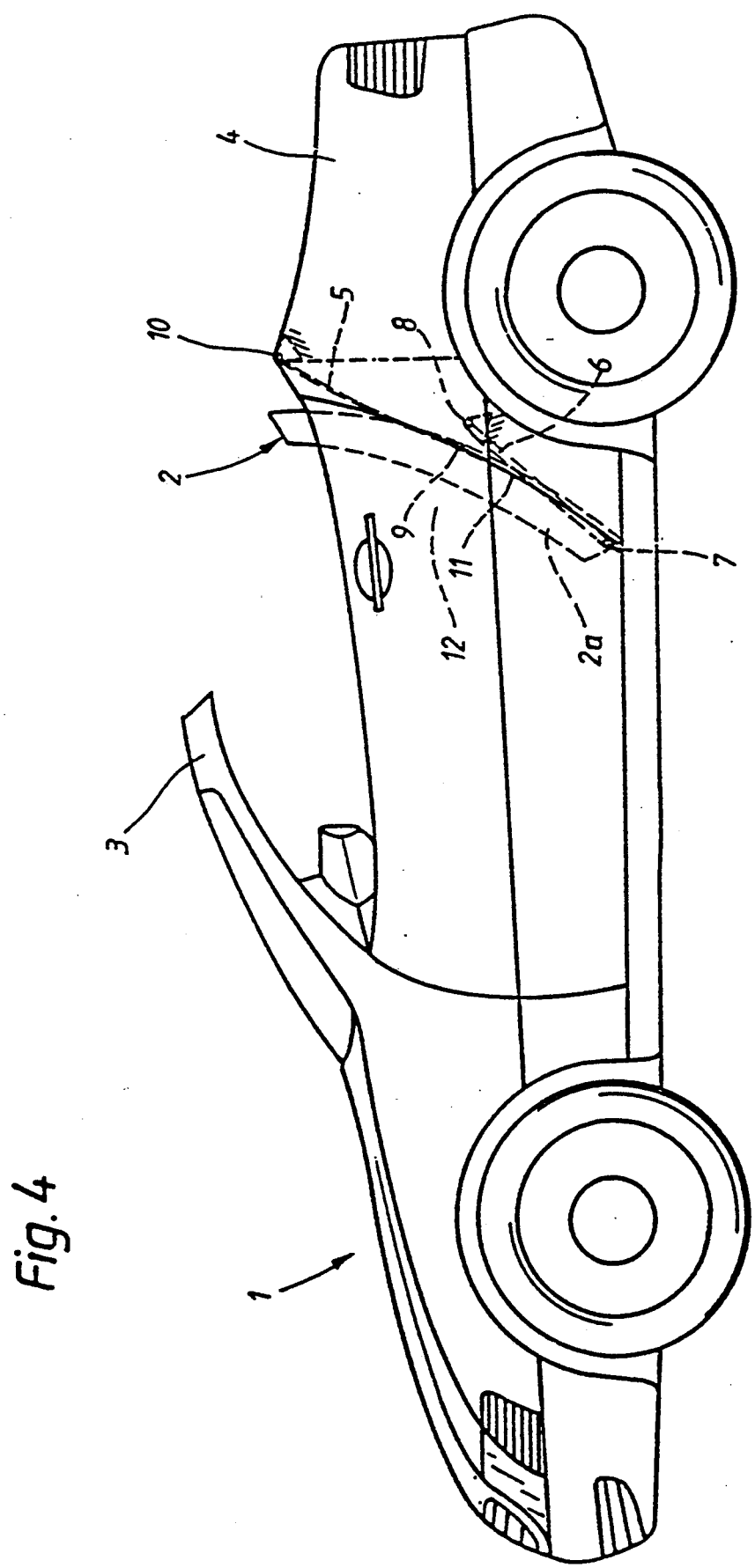
FIG. 4 is a view similar to FIG. 1 and shows the hard roof after the conclusion of the last phase of the opening movement.

In the lower end position shown in FIG. 4, the roof 2 is in the stowage position envisaged, in which it is almost completely retracted in the receiving space 12. Since, in the final phase of the lowering movement, it has undergone parallel displacement rearwards, it is then situated directly in front of an oblique transverse plane of the receiving space 12. In this oblique plane, the rear window 5, which has been swivelled downwards by about 90° out of its operating position, has been stowed. The roof pillars 2a are situated below the rear window 5, virtually in the same transverse plane, as a result of which the window aperture enclosed by the sealing seat 11 and situated between the roof pillars 2a is completely free. Consequently, between the two roof pillars 2a of the roof 2 which has been stowed, there is sufficient accommodation space for a travel bag or other relatively small pieces of luggage, the extent of which space in the transverse direction of the cabriolet 1 is apparent in conjunction with the three-dimensional representation of FIG. 5.

FIG. 6 shows another embodiment of the cabriolet 1 which differs from the embodiment described above principally by a modified lever geometry. To simplify the description, therefore, only the differences are explained in detail and functionally corresponding components are provided with identical reference numerals, identified in each case by the addition of 20.

With respect to roof 22, the hinge joints 30 are at a longitudinal distance behind the rear window 25 on the body of the cabriolet 21. Accordingly, the rear window 25 can no longer fulfill the function of a guiding link, at least not by itself. For this reason, two correspondingly longer guiding links 33 are connected to the rear window 25 over their length overlapping the rear window. The guiding links 33 each extend along one of the lateral window edges of the rear window 25 in the manner of a window frame. It is possible for the connection to be produced by an adhesive strip or, alternatively, by a clamping arrangement engaging around the associated window edge.

Below the rear window 25, which thus takes part in all the swivelling movements of the two guiding links 33, the guiding links 33 initially extend obliquely downwards in the extension of that window edge of the rear window 25 which is associated with them, and then merge with a bend directed obliquely upwards into their end region running towards their hinge joint 30. Despite the guiding links 33, it is possible to provide a swivel-up roll bar 34 which is retracted into a body well surrounding the rear window 25 at the rear and laterally as shown in FIG. 7. The roll bar 34 is attached to the body of the cabriolet 21 below the rear window 25 via hinge joints 35. Since, in the retracted condition, the central region of the roll bar 34 is overlapped by the lower window edge of the rear window 25, which is curved over its transverse extension, the roll bar 34 cannot be raised while the roof 22 is closed. However, this is not a problem because the roll-over strength of the cabriolet 21 with the roof 22 closed is fully adequate for the required protection of the occupants. With the roof 22 open, the rear window 25 is swivelled forwards into the receiving space 32, allowing the roll bar 34 to be moved into its erect protective position unhindered.

Figure 8:
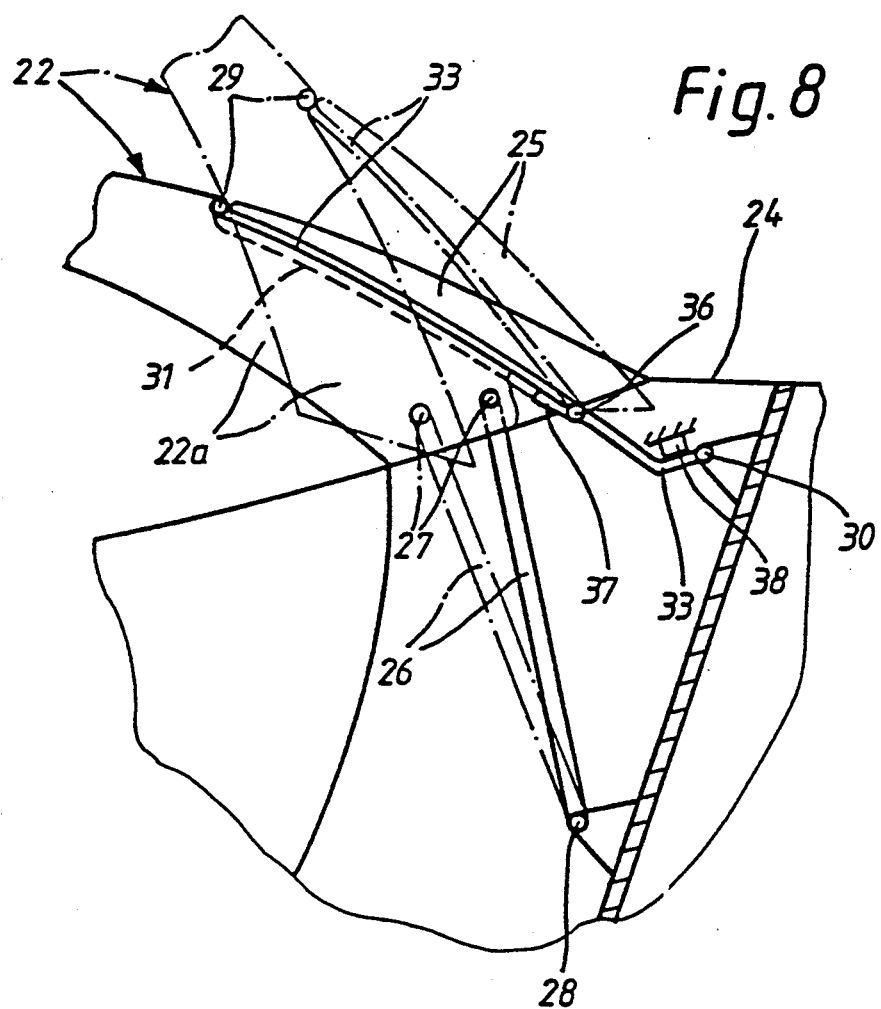
FIG. 8 is a partial view of the cabriolet similar to FIG. 6, with multi-element guiding links.

FIG. 8 shows another embodiment of the roof 22 with modified guiding links 33, which have an intermediate joint 36 in each case near to the lower window edge of the rear window 25, thereby being divided into two longitudinal portions which can be swivelled relative to one another. In order to guarantee a constrained motion of the guiding links 33 in spite of the intermediate joints 36, the intermediate joint 36 of each of the two guiding links 33 has a locking stop 37 which is firmly connected to the lower longitudinal portion of the guiding link 33 and projects upwards beyond the intermediate joint 36. The upper longitudinal portion of the guiding link 33 is thereby blocked from swivelling in the counterclockwise direction about the hinge axis of the intermediate joint 36 relative to the lower longitudinal portion. With the roof 22 closed, the upward-bent end region of the lower longitudinal portion of the guiding links 33 furthermore rests against a stop 38 fixed to the body, as a result of which it is blocked against swivelling in the clockwise direction. As represented by dot-dash phantom lines, a process in which the rear window 25 is lifted from the sealing seat 31 occurs already in the first motion phase when the roof 22 is opened, due to the intermediate joint 36, since the upper longitudinal portion of the guiding link 33 is swivelled rearwards about the hinge axis of the intermediate joint 36 while the roof pillar 22a is simultaneously swivelled forwards about the axis of the hinge joint 29.

In the final motion phase during the closure of the roof 22, this process is reversed, and thus relative displacements between the rear window 25 and the sealing seat 31 are largely prevented. Sealing at the sealing seat 31 can thus be effected by customary hollow-profile seals.

Instead of guiding links 33 divided up by the intermediate joint 36, it is also be possible to provide two hinge arms which correspond to the lower longitudinal portions of the guiding links 33 and are articulated directly on the rear window 25 via the intermediate joint 36. In such an embodiment, the two intermediate joints 36 replace the two hinge joints 10 of the rear window 5 having the overall effect of a guiding link.

Figure 9:
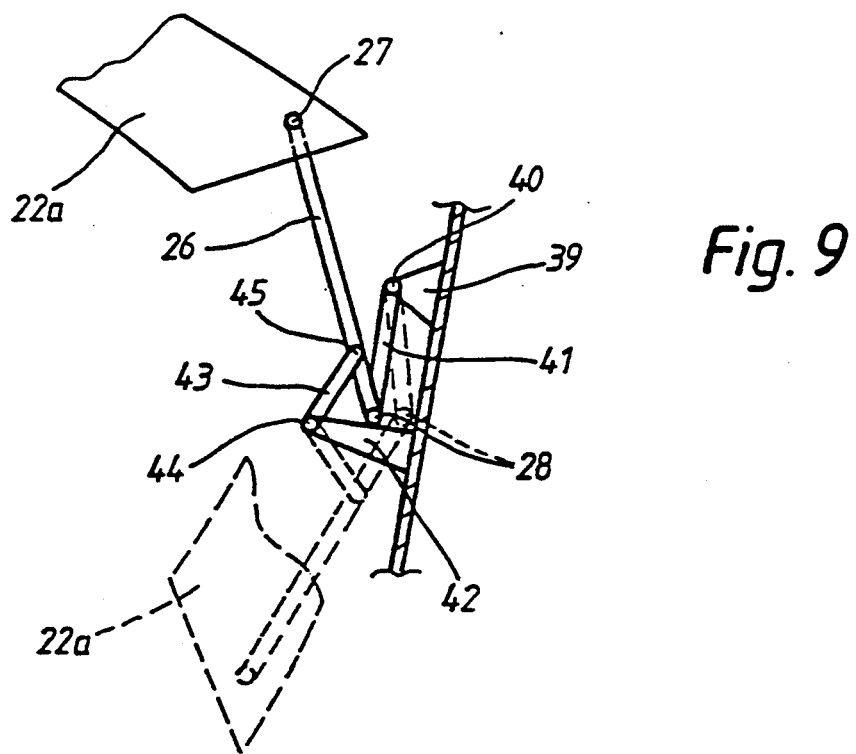
FIG. 9 is a side view of a longitudinally displaceable joint design for the attachment of the supporting links on the superstructure.

The use of hinge joints 7, 8, 9, 10 or 27, 28, 29, 30, 36 arranged fixed to structural members, as above described, is not the only possibility for articulating the roof 2 or 22 on the body of the respective cabriolet 1 or 21. For example, it may be more expedient, in order to achieve better use of the construction space, to arrange a pair of hinge joints such that they are slidingly movable in the longitudinal direction of the vehicle. The principle envisaged for this purpose, which permits retention of the constrained motion of the rod mechanism, can be seen in FIG. 9 which shows a displaceable articulation of the supporting links 26 on the body. For this purpose, a bracket 39 projects forwards above the hinge joint 28 from an end wall extending in the transverse direction of the cabriolet 21, and a supporting lever 41 is suspended pendulum-fashion via a hinge joint 40 at the front end of the bracket 39. The lower end of the supporting lever 41 is connected, via a hinge joint 28, to the lower end of a supporting line 26, as a result of which the supporting link 26 can deflect about a hinge bearing 27 on the roof pillar 22a. Projecting forwards from an end wall of the cabriolet 21, below the swinging range of the supporting link 26, is a further bracket 42 which is considerably longer than the bracket 39. Supported on the front end of the bracket 42 is a control lever 43 which, with the roof 22 closed, is directed obliquely upwards and rearwards. In this arrangement, the lower end of the control lever 43 is connected via a hinge joint 44 to the bracket 42, and the upper end of the control lever 43 is connected below the hinge joint 40, via a hinge joint 45, to the supporting link 26. By virtue of this configuration, the supporting lever 41 swings rearwardly out of a forward-deflected starting position when the roof 22 is retracted, being driven by the supporting link 26, until it has reached its rear end position. The control lever 43 bringing about the displacement of the hinge joint 28 during this process swings downwards past the bracket 42 during this process, since it necessarily takes part in the swivelling movement of the supporting link 26. The end position of the lever geometry with the roof 22 in a retracted position is indicated by dashed lines in FIG. 9.

Figure 10:
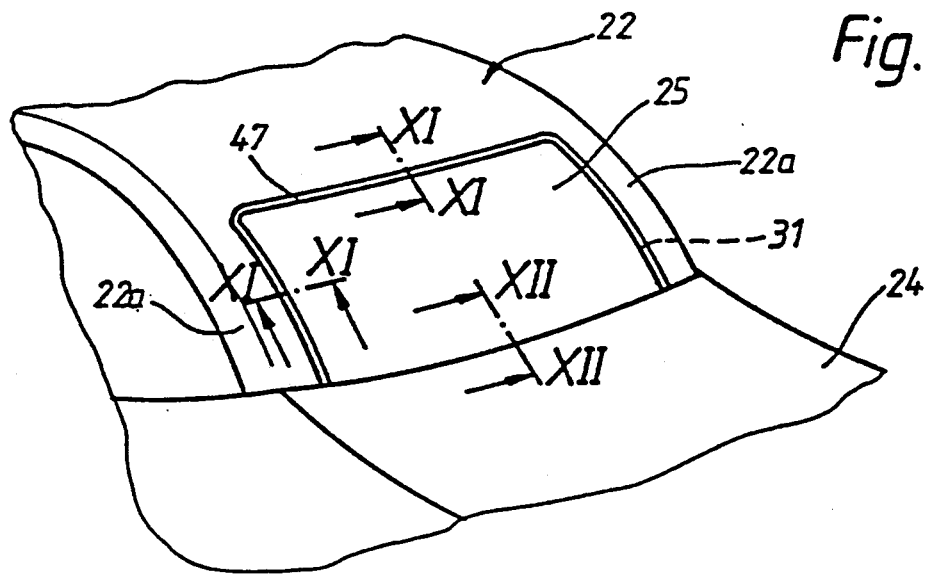
FIG. 10 is a perspective view of a retractable hard roof with a framed rear window.
Figure 11:
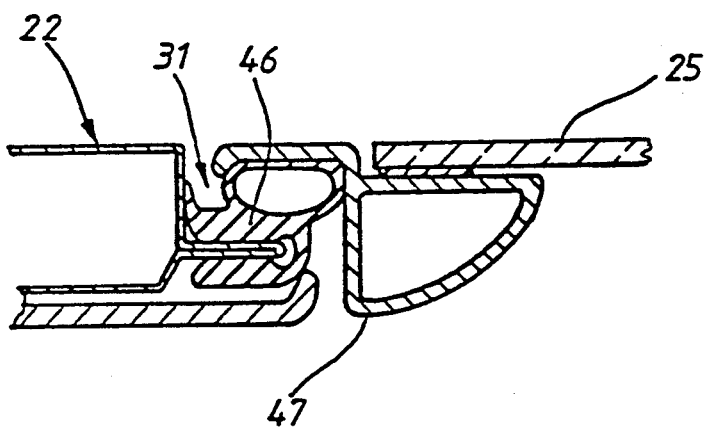
FIGS. 11 and 12 each show sectional representations through the seal arrangement of the rear window shown in FIG. 10.
Figure 12:
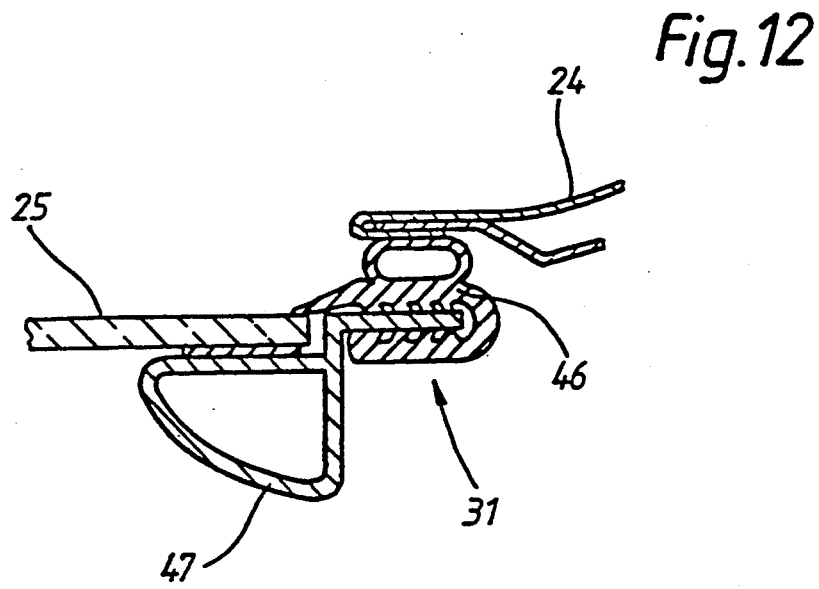

FIGS. 10 to 12 show another embodiment for a sealing arrangement at the sealing seat 31. This sealing arrangement can also be implemented in a similar manner at the sealing seat 11. The sealing member is a hollow-profile seal 46 which is secured on a seam of the roof 22 along the upper edge of the rear window 25 and along its lateral edges (FIG. 11), while a separately arranged longitudinal portion of the hollow-profile seal 46 is arranged on the rear window 25 itself along the lower window edge and interacts with a seam on the luggage-compartment part 24 (FIG. 12). A window frame 47 adjoins a hollow-profile cross-section overlapped by the window edges, which cross-section is adhesively bonded on the window. The window frame 47 encircles the rear window 25 and has a circumferential web, the surface of which is flush with the plane of the window. The associated longitudinal portion of the hollow-profile seal 46 is pushed onto the web of the lower window-frame section and thus secured by clamping. At the top and to the side of the rear window 25, the web of the window frame 46 forms a bearing surface which is fixed on the window and interacts sealingly with the opposite longitudinal portion of the hollow-profile seal 46. Even with the presence of a sealing lip integrally formed on the hollow-profile seal 46, it is thus possible to make use all the way around of a hollow-profile seal 46 of equal cross-section, which is favorable in terms of production.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A retractable vehicle roof for covering a passenger space of a vehicle, comprising a roof shell configured to cover the passenger space, a rear roof window, roof pillars associated with and rearwardly of the roof shell and extending along sides of the roof rear window and movable with respect to the roof rear window, the roof shell situated forwardly of the roof pillars, and the roof being configured to have a stowing position in a receiving space situated below the roof pillars in a closed position of the roof shell over the passenger space and to move into the receiving space, with the roof pillars configured to move into the receiving space first during a retraction operation of the roof shell to uncover the passenger space, such that the roof is located with a forward region of the roof shell disposed substantially vertically in the receiving space, wherein, with the roof in the closed position over the passenger space, the rear window forms a lower width boundary of the roof lying between the roof pillars and is configured to be moved out of the closed position into the stowing position, in which, with the roof shell in the stowing position, the rear window is vertically spaced from lower ends of the roof pillars such that a window aperture between the roof pillars and the roof shell defines an open space to accommodate storage items in the receiving space, and, for the purpose of constrained motion control during the retraction operation, the roof is operatively attached to the vehicle body via a link arrangement comprising two supporting links which are mirror-symmetrical in relation to a longitudinal center plane of the vehicle, and the upper ends of each of the two supporting links in the closed position are articulated in a lower end region on an associated one of the roof pillars, and at least one guiding link extends parallel to a line of inclination of the rear window and is operatively articulated above the rear window in the closed position on the roof shell and below the rear window on the body of the vehicle said at least one guiding link being constituted by the rear window as a result of which, in the course of the retraction operation, the rear window automatically lifts from an associated sealing seat on the roof and undergoes a forward and downward swinging movement of the guiding link in a direction the same as the supporting links.

2. A retractable vehicle roof for covering a passenger space of a vehicle, comprising a roof shell configured to cover the passenger space, a rear roof window, roof pillars associated with and rearwardly of the roof shell and extending along sides of the roof rear window and movable with respect to the roof rear window, the roof shell situated forwardly of the roof pillars, and the roof being configured to have a stowing position in a receiving space situated below the roof pillars in a closed position of the roof shell over the passenger space and to move into the receiving space, with the roof pillars configured to move into the receiving space first during a retraction operation of the roof shell to uncover the passenger space, such that the roof is located with a forward region of the roof shell disposed substantially vertically in the receiving space, wherein, with the roof in the closed position over the passenger space, the rear window forms a lower width boundary of the roof lying between the roof pillars and is configured to be moved out of the closed position into the stowing position, in which, with the roof shell in the stowing position, the rear window is vertically spaced from lower ends of the roof pillars such that a window aperture between the roof pillars and the roof shell defines an open space to accommodate storage items in the receiving space, and, for the purpose of constrained motion control during the retraction operation, the roof is operatively attached to the vehicle body via a link arrangement comprising two supporting links which are mirror-symmetrical in relation to a longitudinal center plane of the vehicle, and the upper ends of each of the two supporting links in the closed position are articulated in a lower end region on an associated one of the roof pillars, and at least one guiding link extends parallel to a line of inclination of the rear window and is operatively articulated above the rear window in the closed position on the roof shell and below the rear window on the body of the vehicle said at least one guiding link being connected, over its length which overlaps the rear window, to the rear window, as a result of which, in the course of the retraction operation, the rear window automatically lifts from an associated sealing seat on the roof and undergoes a forward and downward swinging movement of the guiding link in a direction the same as the supporting links.

3. The retractable roof according to claim 2, wherein the at least one guiding link comprises two guiding links operatively connected along lateral window edges of the rear window.

4. The retractable roof according to claim 3, wherein the guiding links are articulated on the vehicle body at a longitudinal distance behind the rear window.

5. The retractable roof according to claim 4, wherein, in a longitudinal region of the guiding links adjoining the rear window, the guiding links are initially inclined obliquely downwards in a rearwardly direction of the vehicle and then merge into an upward-angled end region.

6. The retractable roof according to claim 3, wherein, near to a lower window edge of the rear window, each guiding link has an intermediate joint with means for blocking thereof against swivelling in one direction in the operation position of the rear window.

7. The retractable roof according to claim 6, wherein, in a longitudinal region of the guiding links adjoining the rear window, the guiding links are initially inclined obliquely downwards in a rearwardly direction of the vehicle and then merge into an upward-angled end region.

8. The retractable roof according to claim 2, wherein joints of the at least one guiding link are configured as movable hinge joints with hinge axes extending at right angles to a longitudinal center plane of the vehicle.

9. The retractable roof according to claim 8, wherein at least two hinge joints of the link arrangement are arranged so as to be movable in the longitudinal direction of the vehicle.

10. The retractable roof according to claim 9, wherein the link arrangement further comprises a control lever, and each movable hinge joint is suspended pendulum-fashion on a connection component and is constrainedly guided by the control lever.

* * * * *